United States Patent [19]

Rockwell

[11] 4,269,799
[45] May 26, 1981

[54] METHOD OF FORMING FUSION CAST REFRACTORIES

[75] Inventor: Dale L. Rockwell, Belleville, Ill.

[73] Assignee: Combustion Engineering, Inc., Windsor, Conn.

[21] Appl. No.: 108,619

[22] Filed: Dec. 31, 1979

[51] Int. Cl.³ .............................................. C04B 35/60
[52] U.S. Cl. ..................................... 264/85; 264/332
[58] Field of Search .............................. 264/85, 65, 56

[56] References Cited

U.S. PATENT DOCUMENTS

| | | | |
|---|---|---|---|
| 2,632,209 | 3/1953 | Bryer et al. | 264/85 |
| 2,976,598 | 3/1961 | Creutz | 264/85 |
| 2,996,783 | 8/1961 | Mayer | 264/85 |
| 3,417,172 | 12/1968 | Rostoker | 264/85 |
| 4,117,056 | 9/1978 | Jones | 264/85 |

*Primary Examiner*—John Parrish
*Attorney, Agent, or Firm*—Richard H. Berneike

[57] ABSTRACT

Fusion cast refractories are formed by first displacing the air from the mold cavity with an inert, heavy gas, preferably argon. The molten fusion cast refractory is then poured into the mold cavity and allowed to solidify. This procedure minimizes the evolution of gases from molds which have an organic binder and thus reduces the formation of pores in the solidified refractory.

2 Claims, No Drawings

METHOD OF FORMING FUSION CAST REFRACTORIES

BACKGROUND OF THE INVENTION

Fusion cast refractories are refractories which are manufactured by melting the raw materials in an electric arc furnace and then pouring the batch into a mold and allowing it to solidify to form the desired finished shape. Fusion cast refractories are normally formed from alumina usually along with zirconia and silica. Proportions of other minerals such as chromite may be added to control the crystalline structure and physical properties of the end products. The main use for fusion cast refractories is in the glass industry as a lining for glass melting furnaces, due to the chemical stability, impermeability, and resistance to corrosion and erosion at the working temperatures in the glass melting furnaces. Fusion cast refractories are also used in various other industrial applications such as in certain types of chemical reactors.

One type of mold which is used for the casting of fusion cast refractories is formed from white silica sand with an organic-based binder system. Other particulate materials that are used are olivine sand, zircon sand, carbon sand, alumina grain and fused grain such as fused silicon oxide. A variety of organic materials may be used for such binders including oil binders, furan binders and phenolic-urethane binders. When the molten refractory material is poured into a mold with an organic binder, there may be a reaction between the molten refractory material and the organic binder which will evolve gases such as hydrogen, oxygen and nitrogen and also form other gases such as carbon monoxide and water. A result of the formation of these gases is that porosity defects occur in the solidified refractory material. These defects may vary from only minor subsurface pores, which still have acceptable density, to extremely unacceptable pore patterns which occur through the entire casting. Factors which have an effect on the extent of the pores are the pouring time and temperature and the resulting exposure of the mold cavity to thermal degradation. Also, the chemical composition of the organic binder has an effect. For example, with a polyisocyanate-polyol binder, gas evolution and defect formation are enhanced when the ratio of polyisocyanate to polyol is greater than one, which is usually the case.

SUMMARY OF THE INVENTION

An object of the present invention is to eliminate or minimize the evolution and formation of gases during the casting of fusion cast refractories in molds which have an organic-based binder system. This is accomplished by displacing the air from the mold cavity with an inert gas which is heavier than air, thus depriving the mold cavity of atmospheric oxygen.

DESCRIPTION OF THE PREFERRED EMBODIMENTS

The present invention recognizes that atmospheric oxygen that is present in a mold cavity in which fusion cast refractory is to be molded plays some role in the formation of pores in the solidified refractory when an organic binder is present. The reaction between the molten refractory and the organic binder in the mold is believed to evolve gases such as hydrogen, oxygen and nitrogen. Typical organic binders which are employed may contain from 1.2 to 4.5 weight percent nitrogen, from 6.0 to 8.5 weight percent hydrogen and up to 15.5 weight percent oxygen. The reaction of the oxygen which is evolved as well as any oxygen which may be present in the air in the mold cavity can then react with the other gases to form complex gases as well as carbon monoxide, carbon dioxide and water.

It has been discovered that the elimination of air and, thus, the elimination of oxygen from the mold cavity prior to pouring the molten refractory into the mold cavity substantially reduces the formation of pores in the solidified refractory. This is accomplished according to the present invention by introducing a heavy (more dense than air), inert gas into the mold cavity by the use of a tube which introduces the gas into the bottom of the mold cavity. The heavy gas will thus displace the lighter air (oxygen and nitrogen) and leave the mold cavity filled substantially with only the inert gas. It is possible to use any heavy, monotomic, inert gas to accomplish the oxygen and nitrogen removal such as krypton and xenon. However, argon is preferred since it is relatively available and inexpensive and has practically zero solubility in most molten products. In actual practice, the normal commercial form of argon would also contain the natural atmospheric quantities of the other rare inert gases. An oxygen detector can be used to monitor the oxygen content of the gas in the mold cavity so that the introduction of the argon can be controlled to reduce the oxygen level to the desired amount without the necessity of using excess amounts of argon.

I claim:

1. A method of forming a fusion cast refractory comprising the steps of:
    (a) providing a mold for said refractory having a mold cavity of the desired shape, said mold including an organic binder and said cavity containing air;
    (b) introducing an inert gas which is heavier than air into said mold cavity whereby said air is displaced from said mold cavity; and
    (c) pouring molten fusion cast refractory material into said mold cavity and allowing it to solidify.

2. A method as recited in claim 1 wherein said inert gas is argon.

* * * * *